(12) United States Patent
Tange

(10) Patent No.: US 12,463,541 B2
(45) Date of Patent: Nov. 4, 2025

(54) SELECTABLE THREE-LEVEL, HALF-BRIDGE CIRCUIT

(71) Applicant: Murata Manufacturing Co., Ltd., Nagaokakyo (JP)

(72) Inventor: Takayuki Tange, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 140 days.

(21) Appl. No.: 17/919,328

(22) PCT Filed: Mar. 22, 2021

(86) PCT No.: PCT/US2021/023389
§ 371 (c)(1),
(2) Date: Oct. 17, 2022

(87) PCT Pub. No.: WO2021/221823
PCT Pub. Date: Nov. 4, 2021

(65) Prior Publication Data
US 2023/0170810 A1 Jun. 1, 2023

Related U.S. Application Data

(60) Provisional application No. 63/018,083, filed on Apr. 30, 2020.

(51) Int. Cl.
*H02M 3/335* (2006.01)
*H02M 1/00* (2006.01)
*H02M 3/07* (2006.01)

(52) U.S. Cl.
CPC ..... *H02M 3/33571* (2021.05); *H02M 1/0095* (2021.05); *H02M 3/07* (2013.01)

(58) Field of Classification Search
CPC .................. H02M 3/07–078; H02M 3/335–42
See application file for complete search history.

(56) References Cited

U.S. PATENT DOCUMENTS

| | | | |
|---|---|---|---|
| 10,171,004 B2 | 1/2019 | Itoh et al. | |
| 2011/0222317 A1* | 9/2011 | Coccia | H02M 7/4837 363/21.02 |

(Continued)

FOREIGN PATENT DOCUMENTS

| | | |
|---|---|---|
| CN | 208174539 U | 11/2018 |
| EP | 2 975 753 A1 | 1/2016 |

OTHER PUBLICATIONS

Chen Zhao, Junming Zhang, Xinke Wu and Zhaoming Qian, "The Analysis of the Charge Unbalance in Flying Capacitors of a Novel Three-level ZVS Converter," 2005 International Conference on Power Electronics and Drives Systems, Kuala Lumpur, Malaysia, 2005, pp. 882-885 (Year: 2005).*

(Continued)

*Primary Examiner* — Peter M Novak
(74) *Attorney, Agent, or Firm* — Keating & Bennett, LLP

(57) ABSTRACT

A DC-DC conversion circuit includes an input voltage; a half-bridge circuit connected to the input voltage and including a first leg with first, second, third, and fourth switching elements connected in series and including a second leg with first and second capacitors connected in series with each other and connected in parallel with the first leg; and a flying capacitor connected to a node between the first switching element and the second switching element and a node between the third switching element and the fourth switching element; a transformer including a primary winding connected to the half-bridge circuit; and a controller that controls the first to fourth switching elements. The controller selectively controls the half-bridge circuit in a half-bridge operation in which ±Vin/2 is applied to the primary winding, where Vin is the input voltage and a 3-level half-bridge operation in which ±Vin/4 is applied to the primary winding.

18 Claims, 17 Drawing Sheets

(56) References Cited

U.S. PATENT DOCUMENTS

2016/0190921 A1 6/2016 Kumar et al.
2019/0052177 A1 2/2019 Lu et al.
2019/0386572 A1 12/2019 Itoh et al.
2022/0021312 A1* 1/2022 Hirokawa ......... H02M 3/33571

OTHER PUBLICATIONS

Official Communication issued in International Patent Application No. PCT/US2021/02389, mailed on Jul. 13, 2021.
Shi, "Wide Load Range Capacitor Clamped ZVZCS Half Bridge Three-Level DC-DC Converter with Two Unsymmetrical Bi-directional Switches", MDPI, energies, Jun. 19, 2019, pp. 1-15.
Xuan et al., A Three-Level Dual-Active-Bridge Converter With Blocking Capacitors for Bidirectional Electric Vehicle Charger, IEEE Access, vol. 7, Dec. 13, 2019, pp. 173838-173847.
Choi et al., "A 92.8%-Peak-Efficiency 60A 48V-to-1V 3-Level Half-Bridge DC-DC Converter with Balanced Voltage on a Flying Capacitor", 2020 IEEE International Solid-State Circuits Conference, 18.6, Session 18, Feb. 18, 2020, 3 pages.

* cited by examiner

SELECTABLE THREE-LEVEL, HALF-BRIDGE CIRCUIT

BACKGROUND OF THE INVENTION

1. Field of the Invention

The present invention relates to a power converter. More specifically, the present invention relates to a selectable three-level, half-bridge (HB) circuit for an isolated direct current-to-direct current (DC-DC) converter.

2. Description of the Related Art

FIG. 1 shows a DC-DC converter 1 from U.S. Pat. No. 10,171,004 that includes a full-bridge circuit 10 connected to a primary winding of a transformer T1, a full-bridge circuit 20 connected to a secondary winding of the transformer T1, a control unit 31 that controls the primary-side full-bridge circuit 10, and a control unit 32 that controls the secondary-side full-bridge circuit 20. The primary-side full-bridge circuit 10 includes a first series circuit including a first set of switching elements Q1-Q4 in parallel with a second series circuit including a second set of switching elements Q5-Q8. The primary-side full-bridge circuit 10 includes a first charge-discharge capacitor Cf1 connected to a node between the switching elements Q1, Q2 and a node between the switching elements Q3, Q4, and a second charge-discharge capacitor Cf2 connected to a node between the switching elements Q5, Q6 and a node between the switching elements Q7, Q8. The full-bridge circuit 10 operates in a full-bridge operation mode, a half-bridge operation mode, or a five-level operation mode.

The control unit 31 controls the primary-side full-bridge circuit 10 in three modes: (i) full-bridge operation in which the switching elements Q1-Q8 are controlled so that voltage applied to the primary winding of the transformer T1 is ±V1, where V1 is the direct-current voltage, (ii) half-bridge operation in which the switching elements Q1-Q8 are controlled so that the voltage applied to the primary winding of the transformer T1 is ±V1/2, and (iii) five-level operation mode that is a combination of the full-bridge operation mode and the half-bridge operation mode in which the switching elements Q1-Q8 are controlled so that the voltage applied to both ends of the primary winding of the transformer T1 is 0, ±V1/2, and ±V1.

Although the different operations are selectable, reducing the size of the inductor or transformer is limited because the voltage applied to the inductor or transformer is half of an input voltage or is the same voltage as the input voltage.

FIG. 2 shows a selectable mode voltage regulator (VR) topology system 100 disclosed in U.S. Patent Publication No. 2016/0190921. FIG. 2 shows that the VR topology system 100 includes a selectable-mode VR 102 and a controller logic 110 used to control switching of switches S1-S5.

FIG. 3 is a plot showing voltage over time of the VR topology system 100 shown in FIG. 2 where the VSW node voltage 202 corresponds to a voltage at a VSW node 104, and the output voltage Vout 204 corresponds to Vout of FIG. 2. In this example, the duty cycle is about 0.33, switch S5 is always OFF, switches S1 and S2 are ON, and switches S3 and S4 are OFF during state interval T1. Switches S1 and S2 are OFF and switches S3 and S4 are ON during state interval T2. Thus, the VSW node voltage 202 may be at or near Vcc (e.g., 12 V) during state interval T1 and at or near zero (i.e., ground) during state interval T2, while the output voltage Vout 204 is maintained constant at about 3 V. FIG. 4 shows a VSW waveform 300 associated with the VSW node 104 of FIG. 2 of a selectable-mode VR controlled as a 3-level buck VR with VSW node voltage at zero, Vcc/2, and Vcc.

Minho Choi et al., "*A 92.8%-Peak-Efficiency 60A 48V-to-1V 3-Level Half-Bridge DC-DC Converter with Balanced Voltage on a Flying Capacitor,*" 18.6, Session 18, IEEE Int'l Solid-State Circuits Conf., 3 pages, January 2020, (Choi et al.) discusses 3-level half-bridge operation. Fig. 18.6.1 of Choi et al. shows a DC-DC converter operated in a single operation mode (i.e., a 3-level half-bridge operation) and including an isolated current-doubling rectifier. Choi et al.'s DC-DC converter converts a narrow input voltage range of 48 V-60 V to a narrow output voltage range of 0.5 V-1 V that is applied to a CPU core. Choi et al. teaches a transformer with primary- and secondary-side circuits. The primary-side circuit includes one leg of four transistor-based switches $Q_{H1}$, $Q_{H2}$, $Q_{L1}$, and $C_{L2}$ in series with each other and a second leg with two capacitors in series. A capacitor Cfly is connected to nodes between the first and the second transistors and between the third and the fourth transistors. Choi et al.'s secondary-side circuit includes inductors that require that the transistor-based switches $Q_{H1}$, $Q_{H2}$, $Q_{L1}$, and $Q_{L2}$ be switched with deadtimes, i.e., a short time when the transistor-based switches $Q_{H1}$, $Q_{H2}$, $Q_{L1}$, and $Q_{L2}$ are all off. Additionally, Choi et al.'s primary-side circuit as shown in Choi et al.'s Fig. 18.6.4 minimizes voltage imbalance on the capacitor Cfly caused by voltage ringing generated by leakage inductance of the transformer and parasitic capacitance of the transistor switches during turn-off periods. The ringing-suppression circuit necessarily adds cost and complexity.

SUMMARY OF THE INVENTION

To overcome the problems described above, preferred embodiments of the present invention provide DC-DC conversion circuitries that include a primary-side, half-bridge topology, in which the DC-DC conversion circuitries are selectively operable in half-bridge (HB) operation in which ±Vin/2 is applied to the primary winding, where Vin is the input voltage, and in 3-level half-bridge (HB) operation in which ±Vin/4 is applied to the primary winding, which allows the transformer to be smaller. Selectable three-level HB operation or HB operation allows for greater design flexibility with one controller IC to cover wide input and output ranges. This keeps components costs down.

According to a preferred embodiment of the present invention, a direct-current to direct-current (DC-DC) conversion circuit includes an input voltage; a half-bridge circuit connected to the input voltage and including a first leg with first, second, third, and fourth switching elements connected in series with each other, a second leg with first and second capacitors connected in series with each other and connected in parallel with the first leg, and a flying capacitor connected to a node between the first switching element and the second switching element and connected to a node between the third switching element and the fourth switching element; a transformer including a primary winding connected to the half-bridge circuit; and a controller that controls the first, the second, the third, and the fourth switching elements. The controller selectively controls the half-bridge circuit in half-bridge operation in which ±Vin/2 is applied to the primary winding, where Vin is the input voltage and in 3-level half-bridge operation in which ±Vin/4 is applied to the primary winding.

According to a preferred embodiment of the present invention, a direct-current to direct-current (DC-DC) conversion circuit includes an input voltage; a half-bridge circuit connected to the input voltage and including a first leg with first, second, third, and fourth switching elements connected in series with each other, a second leg with first and second capacitors connected in series with each other and connected in parallel with the first leg, and a flying capacitor connected to a node between the first switching element and the second switching element and connected to a node between the third switching element and the fourth switching element; a secondary circuit including a rectifier circuit and not including an inductor; a transformer including a primary winding connected to the half-bridge circuit and including a secondary winding connected to the rectifier circuit; and a controller that controls the first, the second, the third, and the fourth switching elements.

The controller can selectively control the half-bridge circuit in half-bridge operation in which ±Vin/2 can be applied to the primary winding, where Vin is the input voltage and in 3-level half-bridge operation in which ±Vin/4 can be applied to the primary winding.

The controller can use pulse width modulated (PWM) control signals. The first, the second, the third, and the fourth switches can be transistors. The primary winding can be connected to a node between the second switching element and the third switching element and can be connected to a node between the first capacitor and the second capacitor. The first switching element and the first capacitor can be connected to the input voltage. The fourth switching element and the second capacitor can be connected to a ground. The controller can switch the first, the second, the third, and the fourth switching elements in half-bridge operation with a 50% duty cycle and in 3-level half-bridge operation with a 25% duty cycle.

Half-bridge operation can include a first mode in which the first switching element and the second switching element can be OFF and the third switching element and the fourth switching element can be ON and in which −Vin/2 can be applied to the primary winding and a second mode in which the first switching element and the second switching element can be ON and the third switching element and the fourth switching element can be OFF and in which Vin/2 can be applied to the primary winding.

Three-level half-bridge operation can include a first mode in which the first switching element and the third switching element can be OFF and the second switching element and the fourth switching element can be ON and in which −Vin/4 can be applied to the primary winding, a second mode in which the first switching element and the second switching element can be OFF and the third switching element and the fourth switching element can be ON and in which Vin/4 can be applied to the primary winding, a third mode in which the first switching element and the third switching element can be OFF and the second switching element and the fourth switching element can be ON and in which −Vin/4 can be applied to the primary winding, and a fourth mode in which the first switching element and the second switching element can be OFF and the third switching element and the fourth switching element can be ON and in which Vin/4 can be applied to the primary winding.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
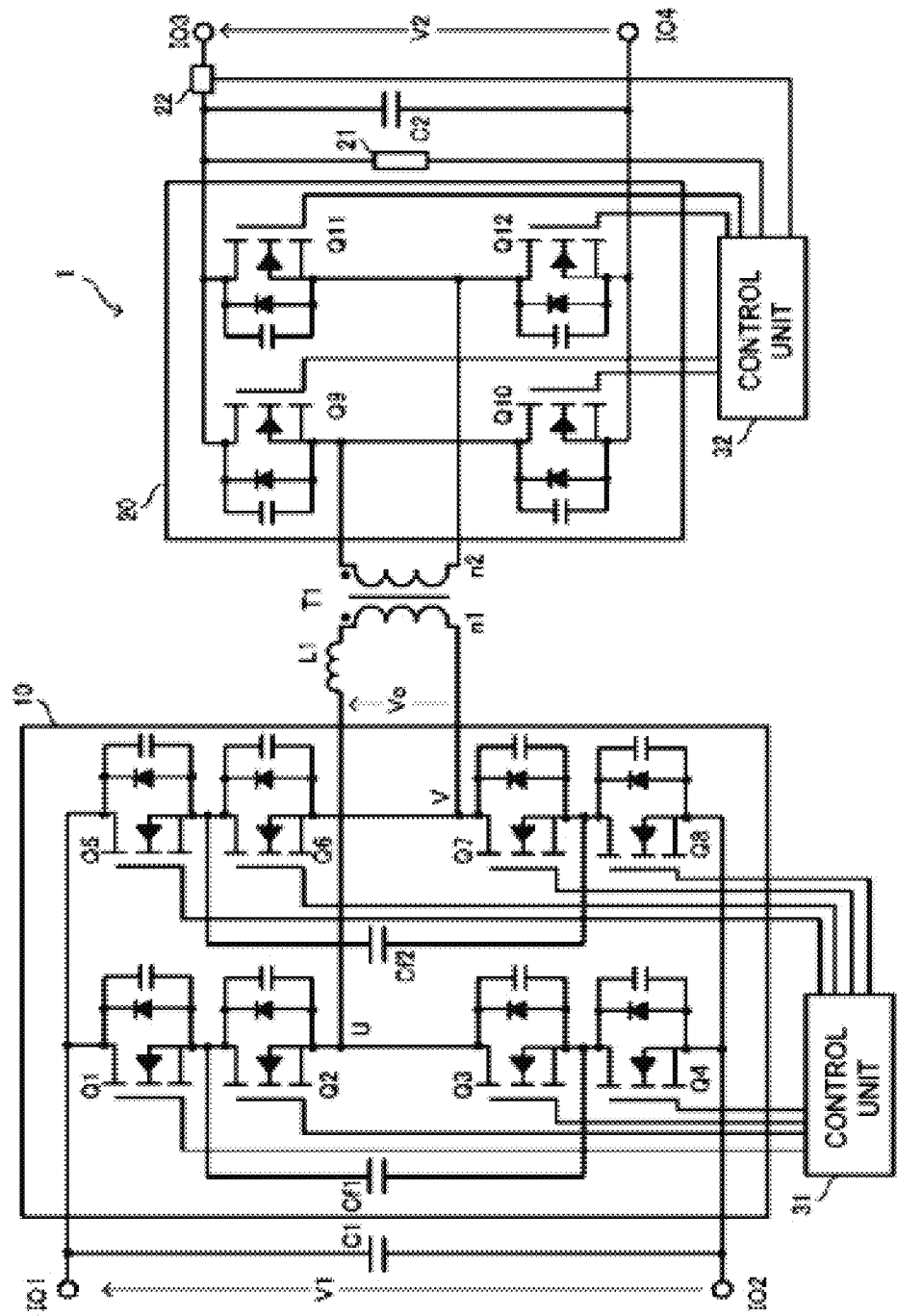
FIG. 1 shows a DC-DC converter of the related art.
Figure 2:
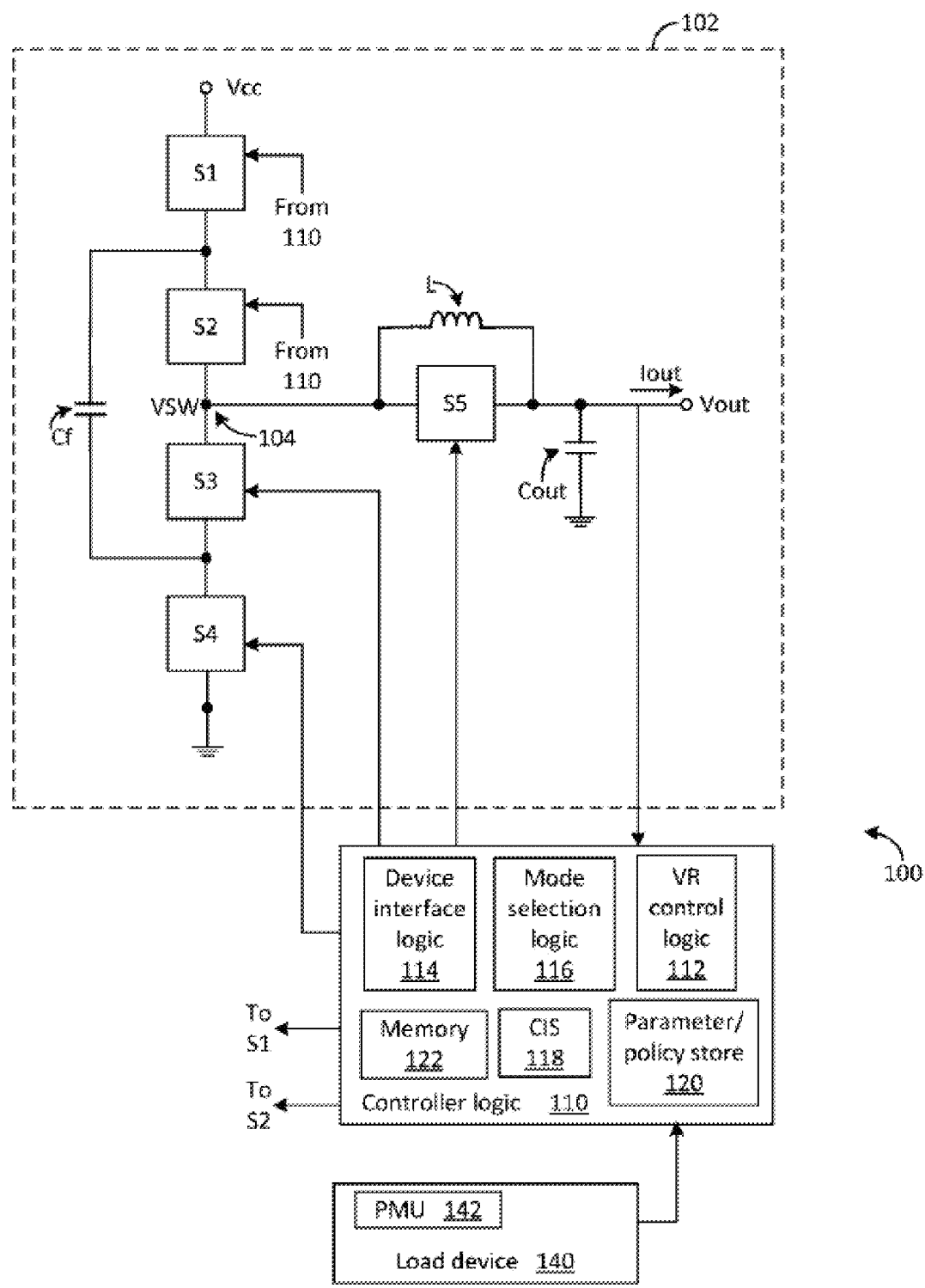
FIG. 2 shows a selectable-mode voltage regulator of the related art.
Figure 3:
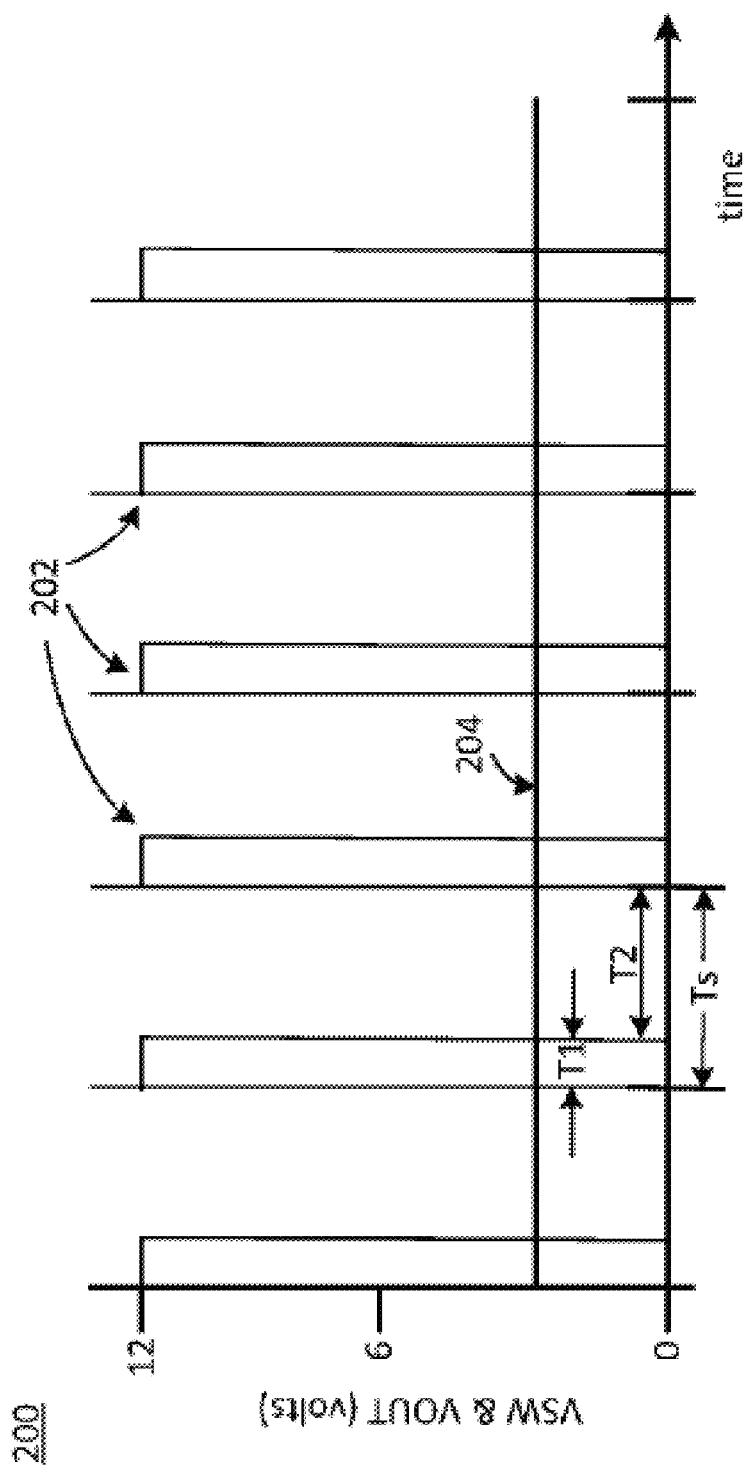
FIG. 3 is a plot showing voltage over time of the selectable-mode voltage regulator of FIG. 2.
Figure 4:
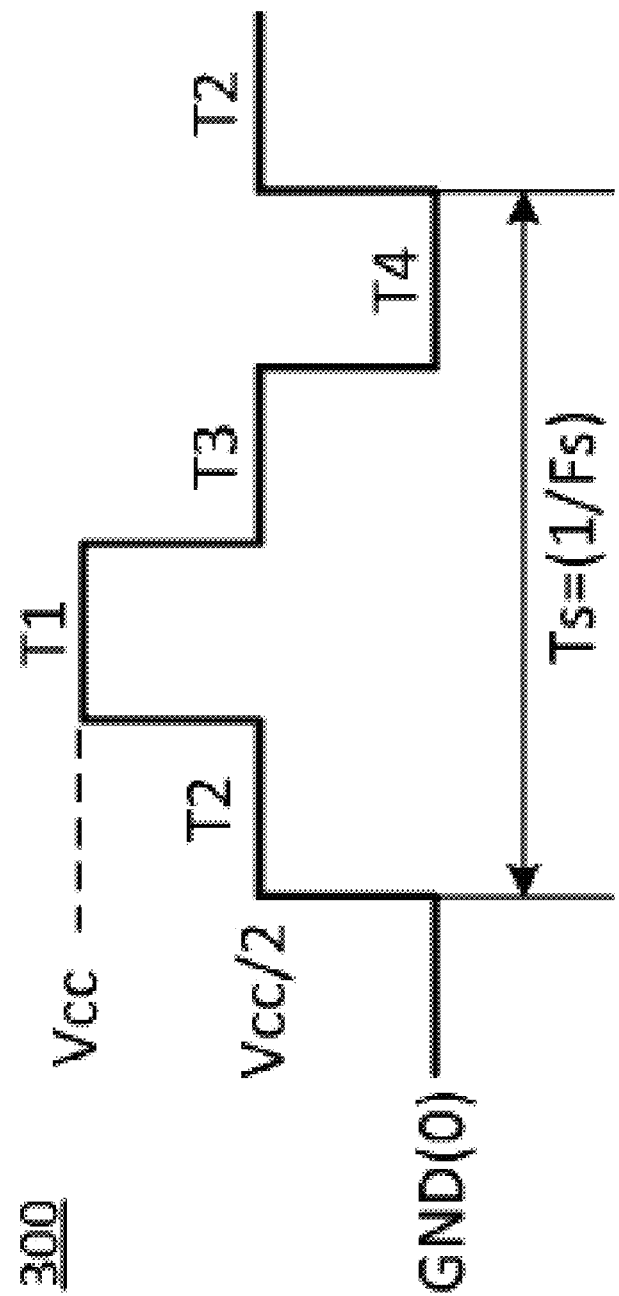
FIG. 4 shows a waveform of the selectable-mode voltage regulator of FIG. 2.
Figure 5:
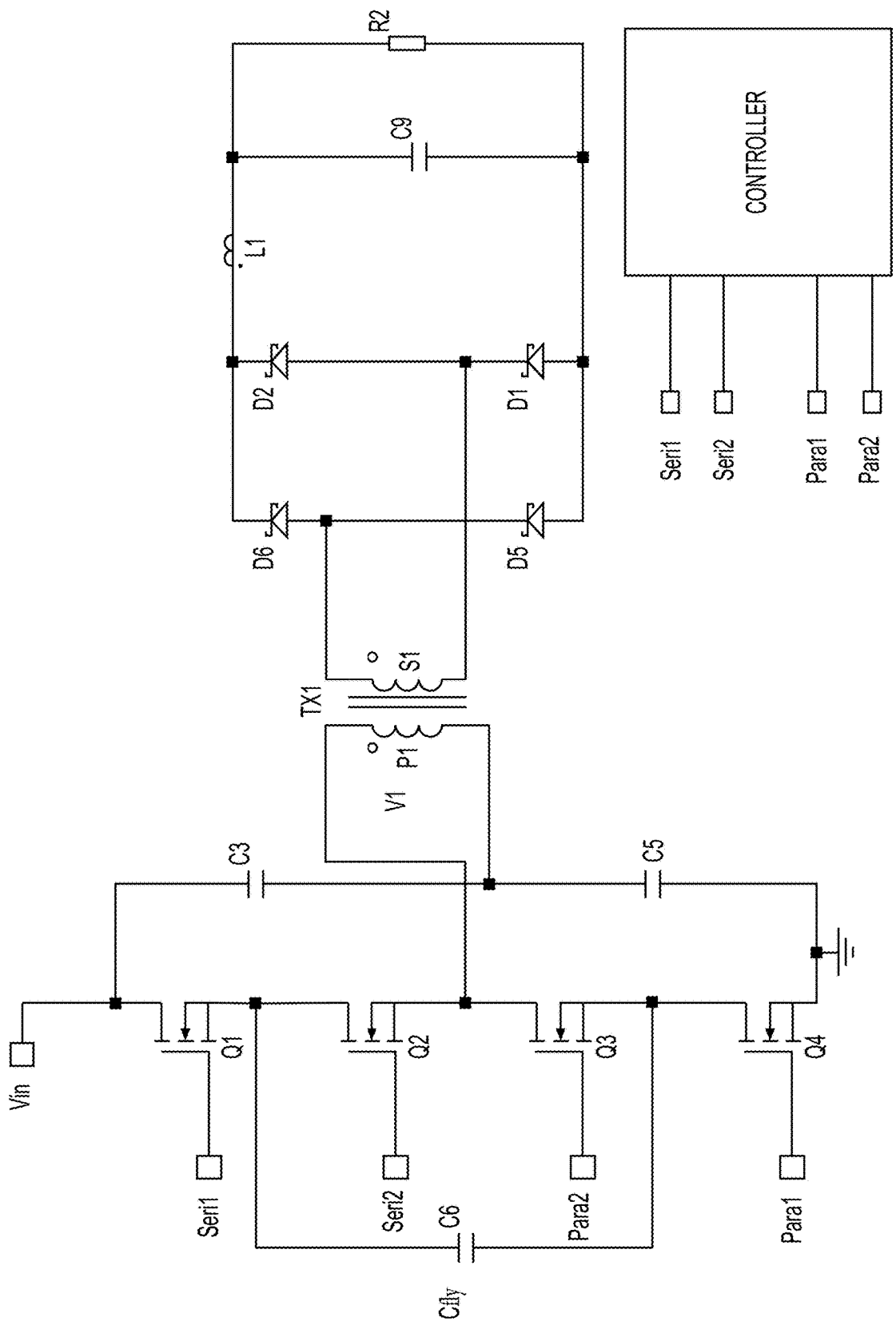
FIG. 5 shows a DC-DC converter circuit that includes a primary-side half-bridge topology.

FIG. 5 shows a DC-DC converter circuit that includes a primary-side half-bridge topology. The half-bridge circuit is connected to a primary winding P1 of a transformer TX1, a rectifier circuit is connected to a secondary winding S1 of the transformer TX1, and a controller is used to control switching in the half-bridge circuit.

The half-bridge circuit includes a first leg with a first set of switching elements Q1 and Q2 in series with a second set of switching elements Q3 and Q4, and includes a second leg with two capacitors C3 and C5 connected in series. The switching elements Q1-Q4 are in parallel with the capacitors C3 and C5. The half-bridge circuit also includes a capacitor Cfly (C6) connected to a node between the first set of switching elements Q1 and Q2 and connected to a node between the second set of switching elements Q3 and Q4. The controller can operate the half-bridge circuit in a half-bridge operation or a 3-level half-bridge operation.

Capacitance values of capacitors C3, C5, and Cfly are chosen based on operating frequency, output current, and transformer inductance. A circuit operated at low frequency and high output current with a low transformer inductance needs high capacitance. To reduce losses during charging and discharging, low equivalent series resistance (ESR) capacitors, like ceramic capacitors, can be used. The capacitance values of capacitors C3, C5, can be the same, and the capacitance value of capacitor Cfly can be different from the capacitance value of capacitors C3, C5.

The switching elements Q1-Q4 can each be a transistor (e.g., field effect transistor (FET), a bipolar junction transistor (BJT), an insulated gate bipolar transistor (IGBT), etc.), a relay, or the like. Each switching element Q1-Q4 includes a respective control terminal, Seri1, Seri2, Para2, Para1, that receives a corresponding control signal from the controller.

Figure 17:
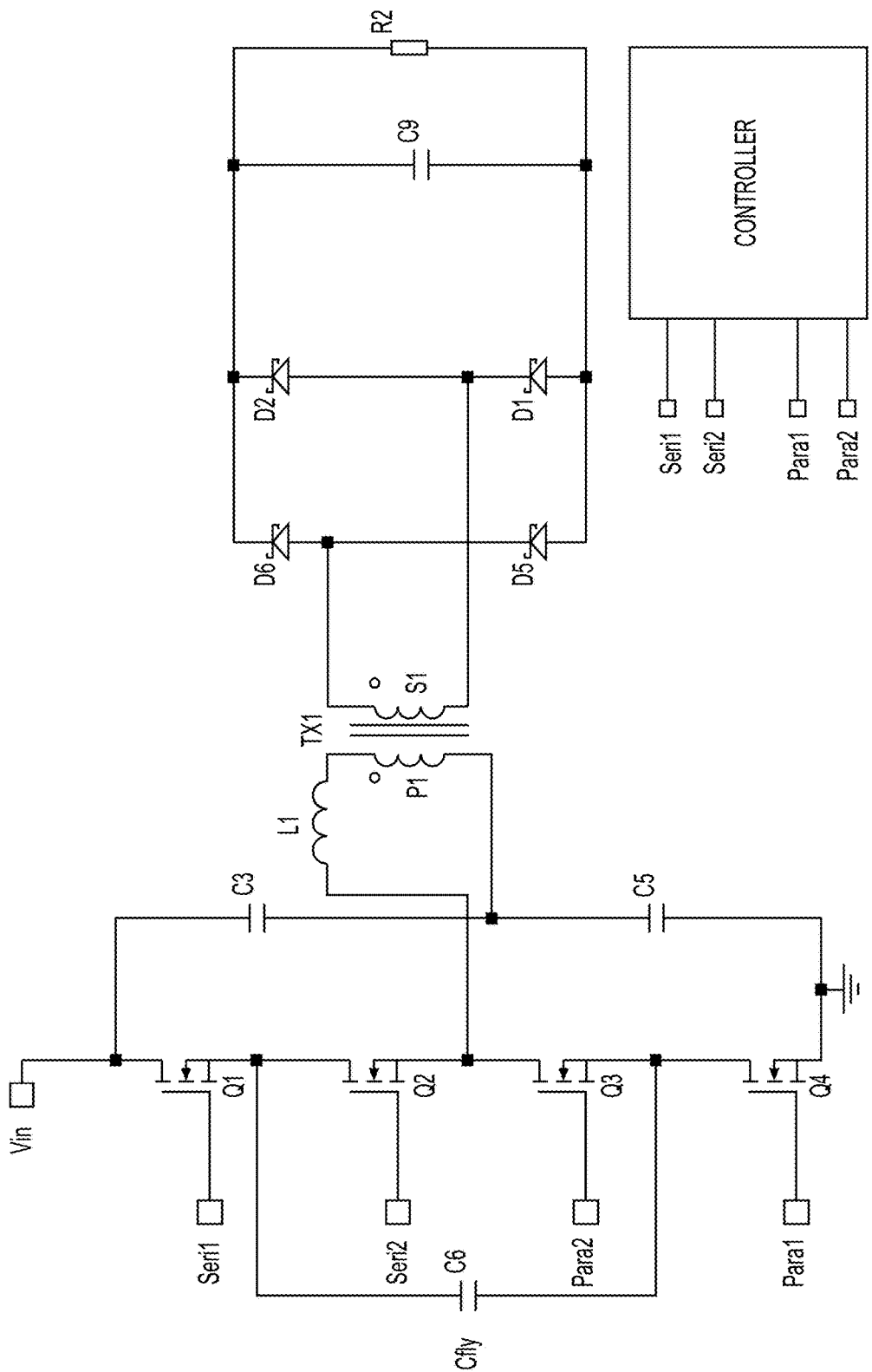
FIG. 17 shows a DC-DC converter circuit similar to the DC-DC converter circuit of FIG. 5 but that includes an inductor connected to the primary winding.

The half-bridge circuit can be operated with zero-voltage switching (ZVS). The DC-DC converter of FIG. 17 is similar to the DC-DC converter of FIG. 5 but with an inductor L1 in the half-bridge circuit that is connected between the primary winding P1 and a node between switching elements Q2 and Q3. The inductor L1 can represent the leakage inductance of the transformer TX1 or can be an added discrete inductor. In ZVS operation, the inductor L1 and the capacitors C3 and C5 define a resonant circuit that resonates over a resonant frequency range. When the switching frequency is within the resonant frequency range, the DC-DC converter is operated with ZVS, which eliminates or reduces switching losses, and which increases circuit efficiency. The secondary circuit does not include an inductor and the switching elements Q1-Q4 can be switched without deadtime.

As shown in FIG. 5, the rectifier circuit can include a diode bridge including diodes D1, D2, D5, D6. Instead of the diode bridge, the rectifier circuit can include synchronous rectifiers. If synchronous rectifiers are used, then the controller can be used to control both the switching elements Q1-Q4 and the synchronous rectifiers. Alternatively, an additional controller can be used to control the synchronous rectifiers.

In addition to the rectifier circuit, the secondary circuit can include a capacitor C9 that can be connected in parallel with the diode bridge and an inductor L1 that can be connected between the diode bride and one of the terminals of the capacitor C9. The inductor L1 and the capacitor C9 can define a filter. The inductor L1 is not necessary. If the inductor L1 is not included in the secondary circuit, then the switching elements Q1-Q4 can be switched with a minimum deadtime to prevent short circuiting between the input voltage Vin to ground. The resistor R2 represents a load of the DC-DC converter.

Figure 6:
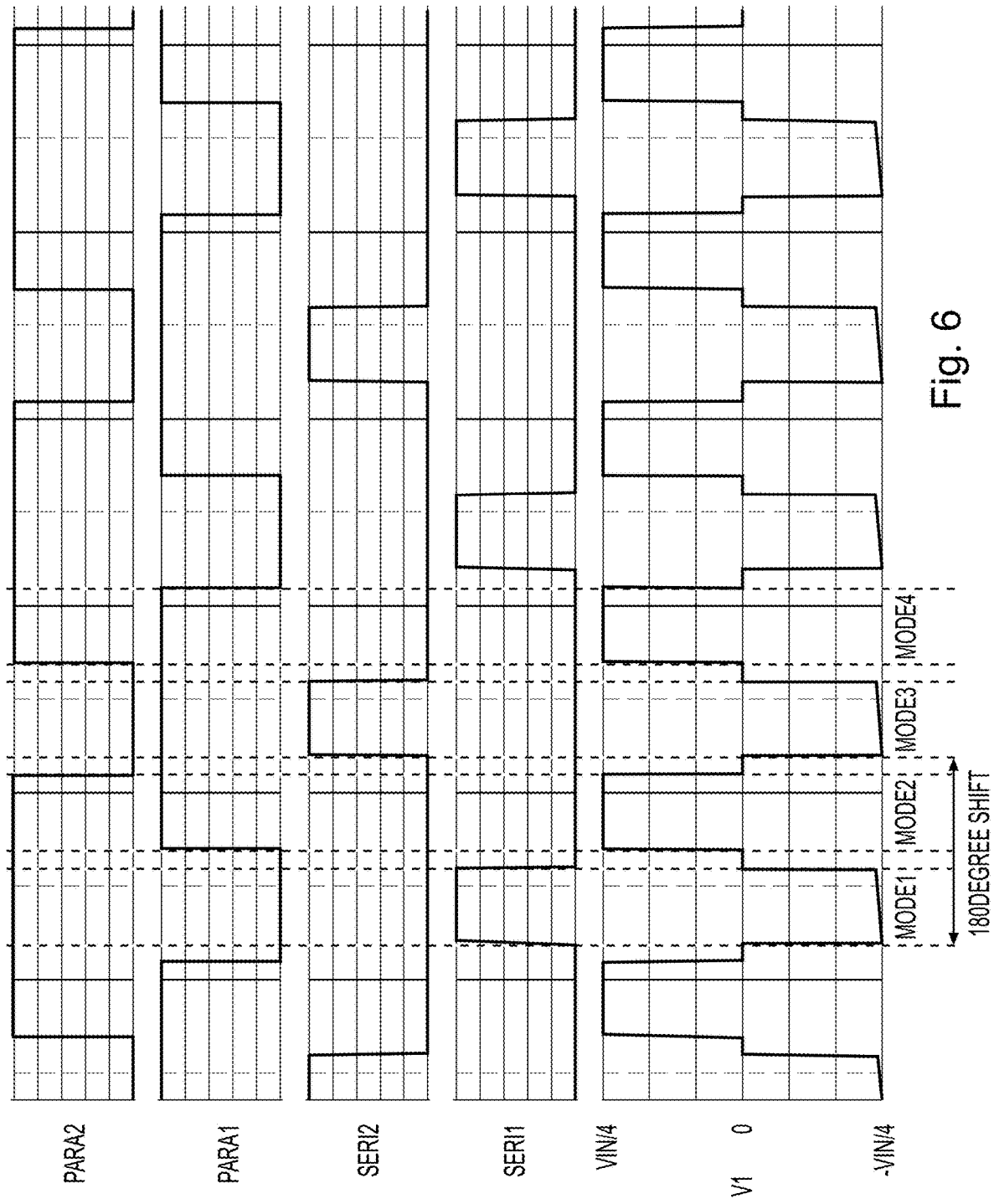
FIG. 6 is plot showing voltage over time in 3-level half-bridge operation of the DC-DC converter circuit of FIG. 5.
Figure 7:
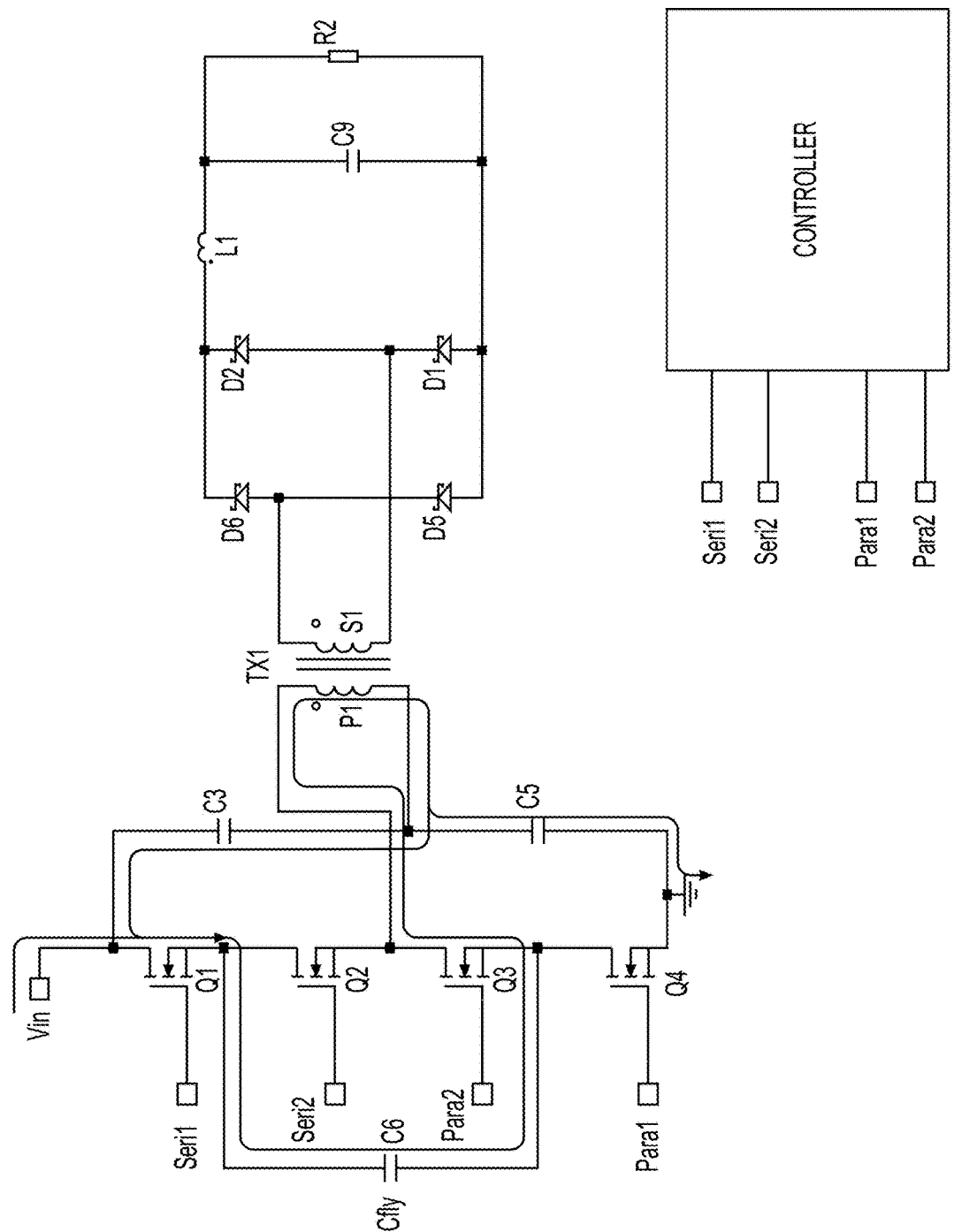
FIGS. 7-10 show current paths of four modes in 3-level half-bridge operation of the DC-DC converter circuit of FIG. 5.
Figure 8:
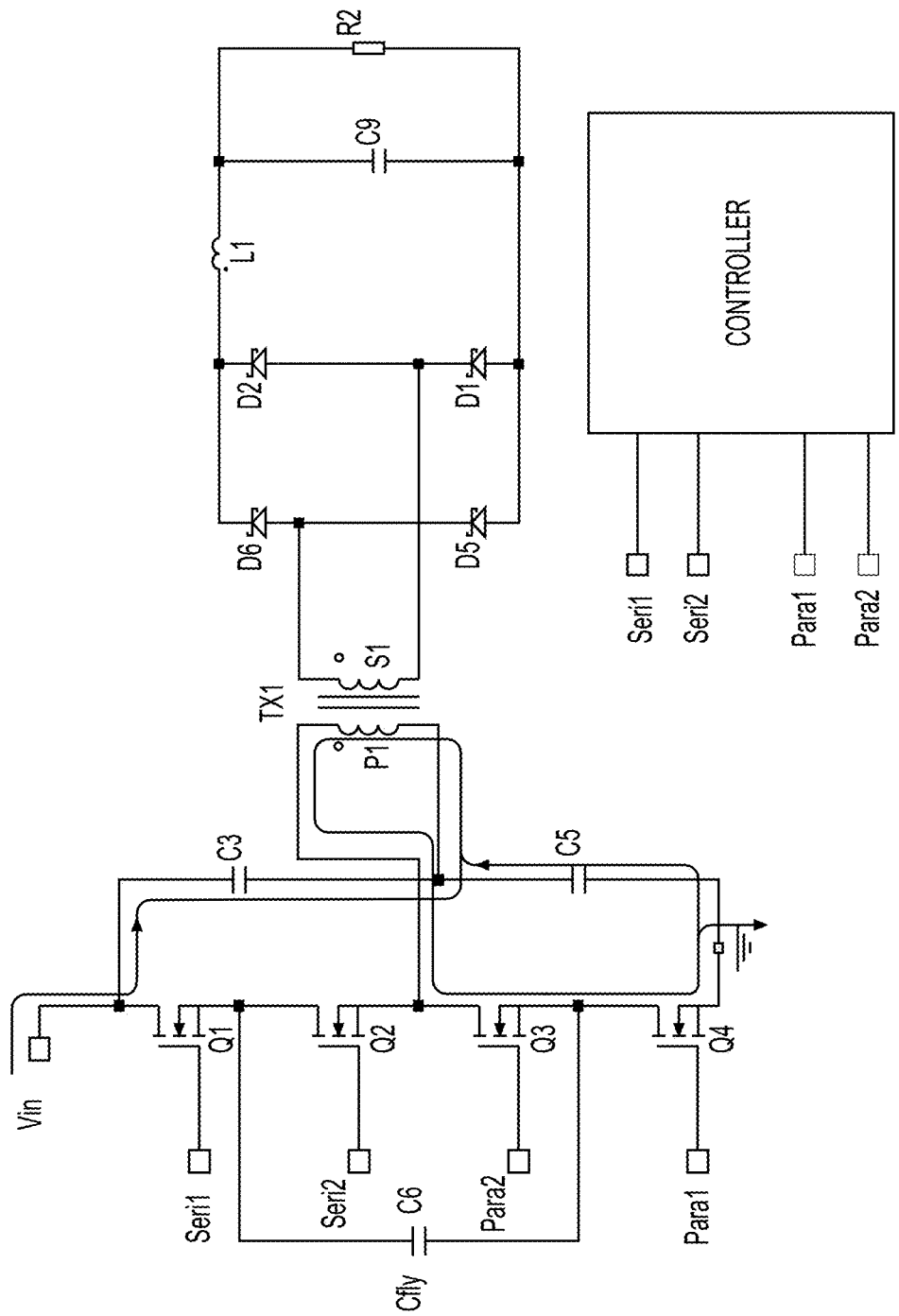
Figure 9:
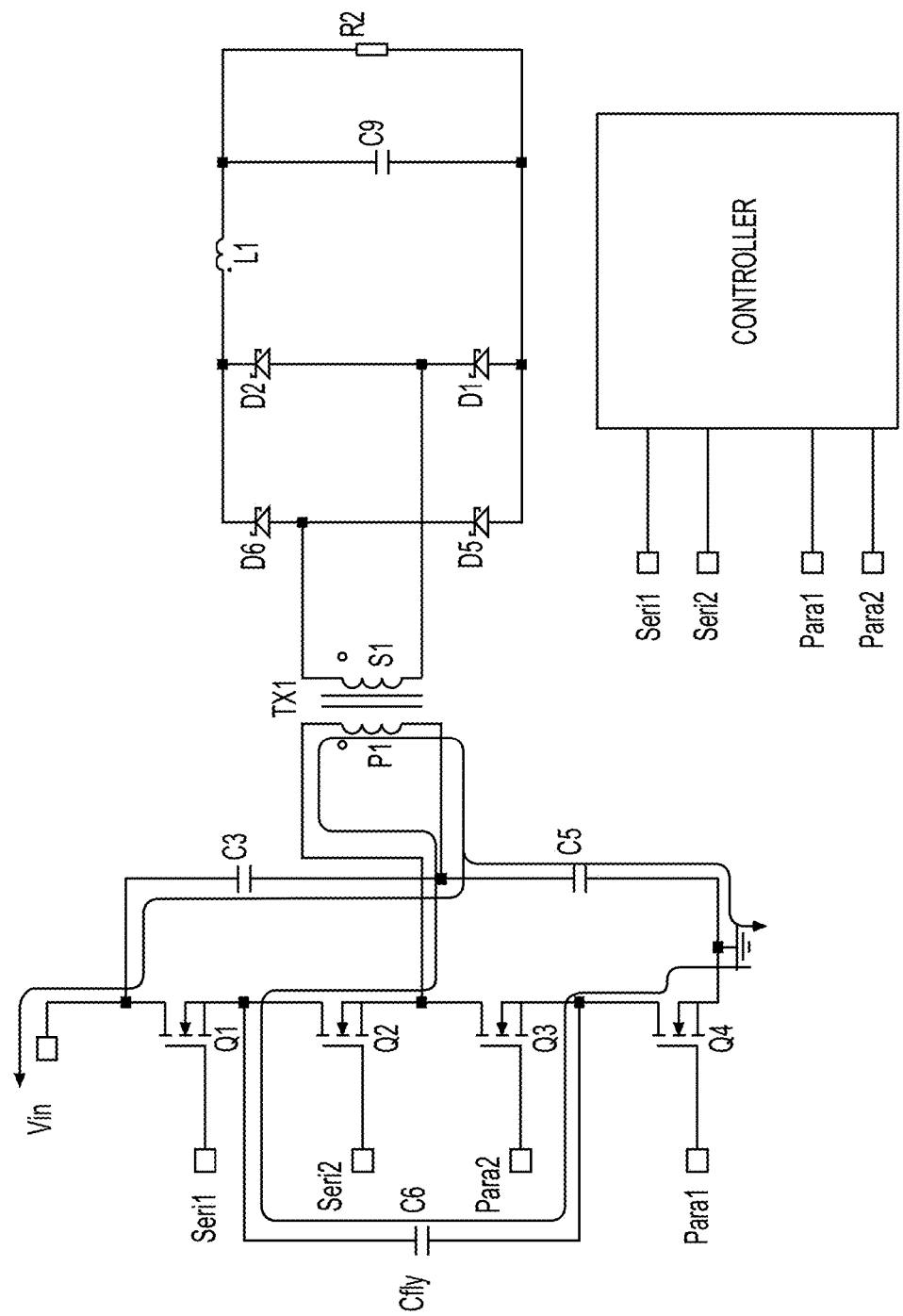
Figure 10:
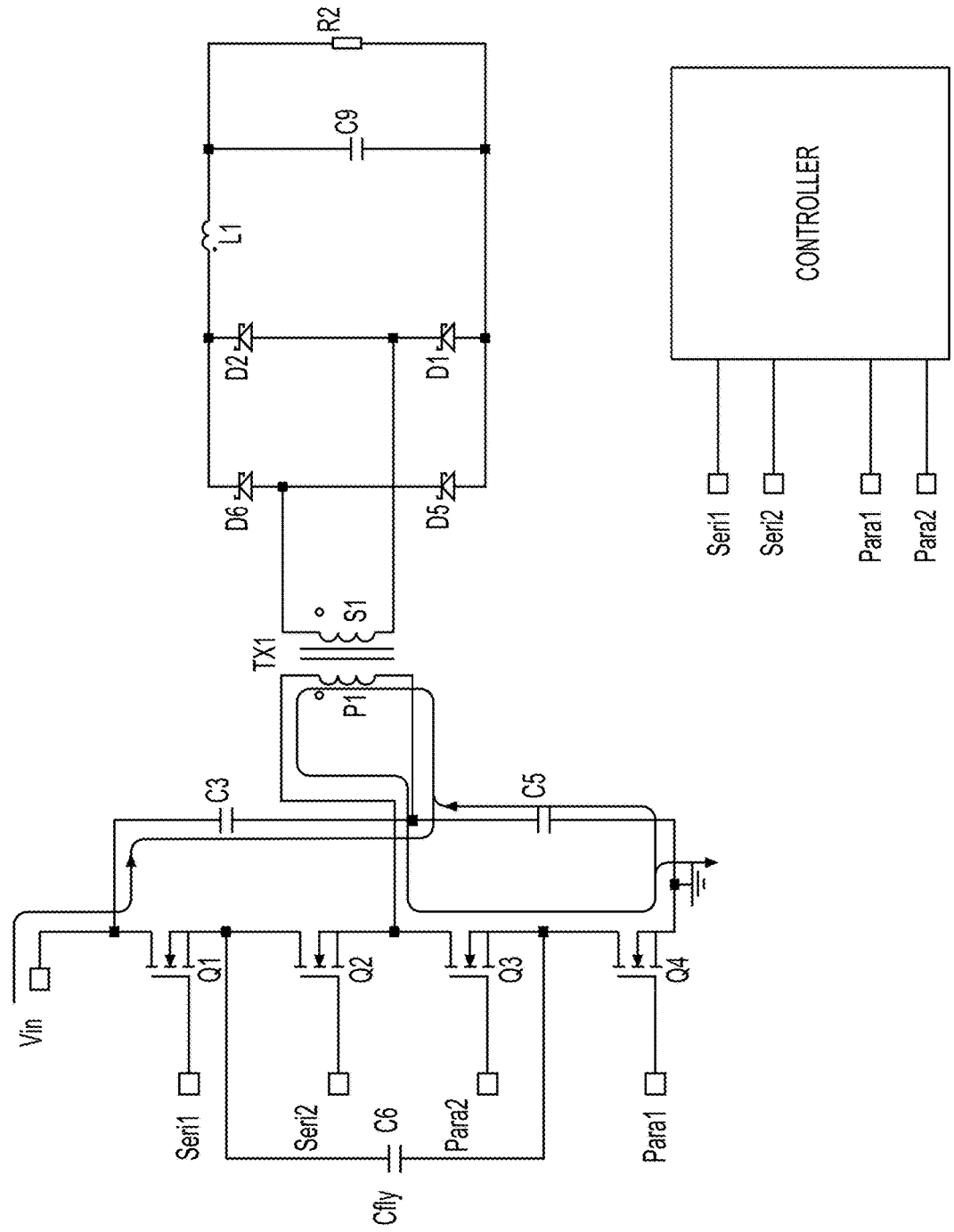

Any suitable controller can be used as the controller. For example, an integrated circuit (IC), application-specific IC, etc. can be used as the controller. The controller controls the switching elements Q1-Q4 of the half-bridge circuit in the 3-level half-bridge operation as shown in the voltage timing diagram of FIG. 6 or in the half-bridge operation as shown in the voltage timing diagram of FIG. 11. There are four modes, Modes 1-4, in the 3-level half-bridge operation in which the four switching elements Q1-Q4 are controlled so that 0 or ±Vin/4, where voltage Vin is the input voltage, is applied to the primary winding P1 of the transformer TX1. The current flow, shown as directional arrows, in the Modes 1-4 is shown in FIGS. 7-10.

The operating frequency is selected based on the transformer and switching losses. The frequency is set to avoid saturation of the transformer TX1. If the frequency is too high and resulting switching loss will also be too high, the frequency is decreased, and the transformer would need to be re-designed to avoid saturation.

The duty cycle is controlled by the controller. Although not shown, the controller can provide regulation by receiving feedback from the primary and/or secondary windings of the transformer TX1. If the feedback voltage changes, then the controller alters the duty cycle to maintain a constant voltage. Alternatively, the DC-DC converter can be unregulated with the controller not providing regulation and not receiving feedback from the primary and/or secondary windings of the transformer TX1. In 3-level half-bridge operation, the duty cycle can be fixed at 25% duty cycle, and in half-bridge operation, the duty cycle can be fixed at 50% duty cycle. The controller can switch between 3-level half-bridge operation and half-bridge operation based on the input voltage and/or the output voltage.

In Mode 1, control signal Seri1 and Para2 are high, and control signals Seri2 and Para1 are low. Thus, switching elements Q1 and Q3 are ON, and the switching elements Q2 and Q4 are OFF. Accordingly, current flows in the path of the arrow shown in FIG. 7 through switching element Q1, capacitor Cfly, switching element Q3, primary winding P1, and capacitors C3 and C5. As such, capacitors Cfly and C5 are charged and capacitor C3 is discharged so that the voltages at capacitors Cfly, C3, and C5 respectively are ½ Vin, ¾ Vin, and ¼ Vin. The voltage at capacitor C5 is lower than that at capacitor C3 because capacitor C5 is always charged through capacitor Cfly. As a result, the voltage applied to the primary winding P1 of transformer TX1 is −Vin/4.

In Mode 2, control signals Seri1 and Seri2 are low, and control signals Para1 and Para2 are high. Thus, switching elements Q1 and Q2 are OFF, and switching elements Q3 and Q4 are ON. Accordingly, current flows in the path of the arrow shown in FIG. 8 through capacitor C3, primary winding P1, switching elements Q4 and Q3, and capacitor C5. Therefore, capacitor C3 is charged by Vin and capacitor C5 is discharged so that the voltages at capacitors Cfly, C3, and C5 respectively are ½ Vin, ¾ Vin, and ¼ Vin. As a result, the voltage applied to the primary winding P1 of transformer TX1 is Vin/4.

In Mode 3, control signals Seri1 and Para2 are low, and control signals Seri2 and Para1 are high. Thus, switching elements Q1 and Q3 are OFF, and switching elements Q2 and Q4 are ON. Accordingly, current flows in the path of the arrow shown in FIG. 9 through switching element Q4, capacitor Cfly, switching element Q2, primary winding P1, and capacitors C3 and C5. Therefore, capacitors Cfly and C3 are discharged and capacitor C5 is charged by capacitor Cfly so that the voltages at capacitors Cfly, C3, and C5 respectively are ½ Vin, ¾ Vin, and ¼ Vin. As a result, the voltage applied to the primary winding P1 of transformer TX1 is −Vin/4.

In Mode 4, control signals Seri1 and Seri2 are low, and control signals Para1 and Para2 are high. Thus, Mode 4 operates in the same manner as that of Mode 2, and the corresponding current flow and voltages are the same.

The switch arrangement described is summarized in Table 1.

TABLE 1

| Mode | Q1 | Q2 | Q3 | Q4 | V1 |
|---|---|---|---|---|---|
| 1 | ON | OFF | ON | OFF | −Vin/4 |
| 2 | OFF | OFF | ON | ON | Vin/4 |
| 3 | OFF | ON | OFF | ON | −Vin/4 |
| 4 | OFF | OFF | ON | ON | Vin/4 |

In the three-level half-bridge operation, capacitor voltages are such that Cfly has ½ Vin, C3 has ¼ Vin, and C5 has ¾ Vin. Capacitor Cfly is charging in Mode1 and discharging in Mode 3, and one half of the input voltage (½ Vin) is applied to one of the terminals of the primary winding. During the time between the modes when there is dead time, there is no current flow on the primary circuit, which means the voltage V1 applied to the primary winding is 0 V. At this time, current stored by an inductor on the secondary side (e.g., inductor L1 in FIG. 5) flows in the secondary circuit.

In the 3-level half-bridge operation, the input voltage Vin is converted to one quarter at the voltage V1 applied to the primary winding P1 of transformer TX1. The primary transformer voltage is converted by the turns ratio of the primary winding P1 to the secondary winding S1. The converted voltage is rectified by the rectifier circuit and then output by the DC-DC converter circuit.

Figure 11:
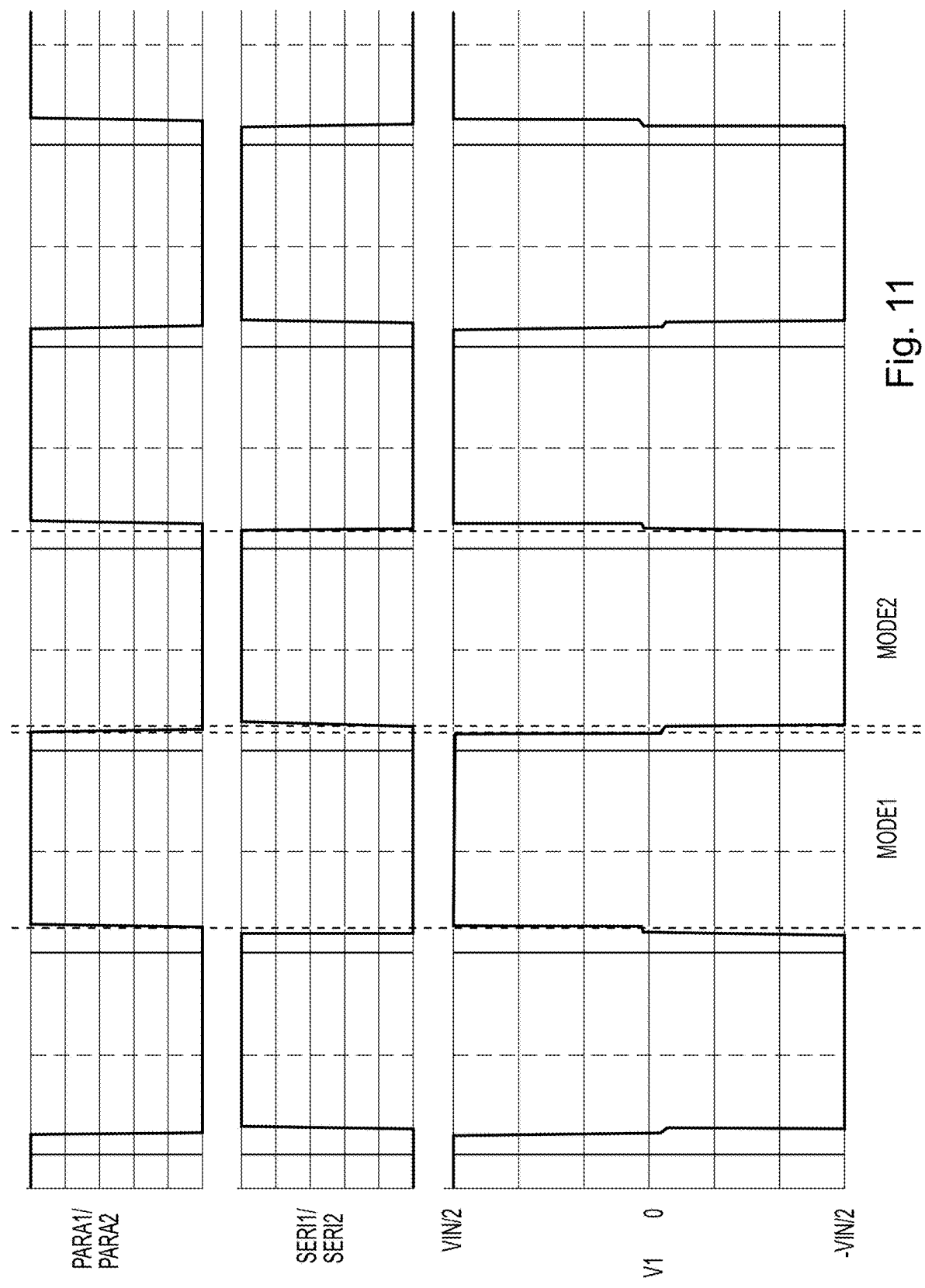
FIG. 11 is plot showing voltage over time in half-bridge operation of the DC-DC converter circuit of FIG. 5.
Figure 12:
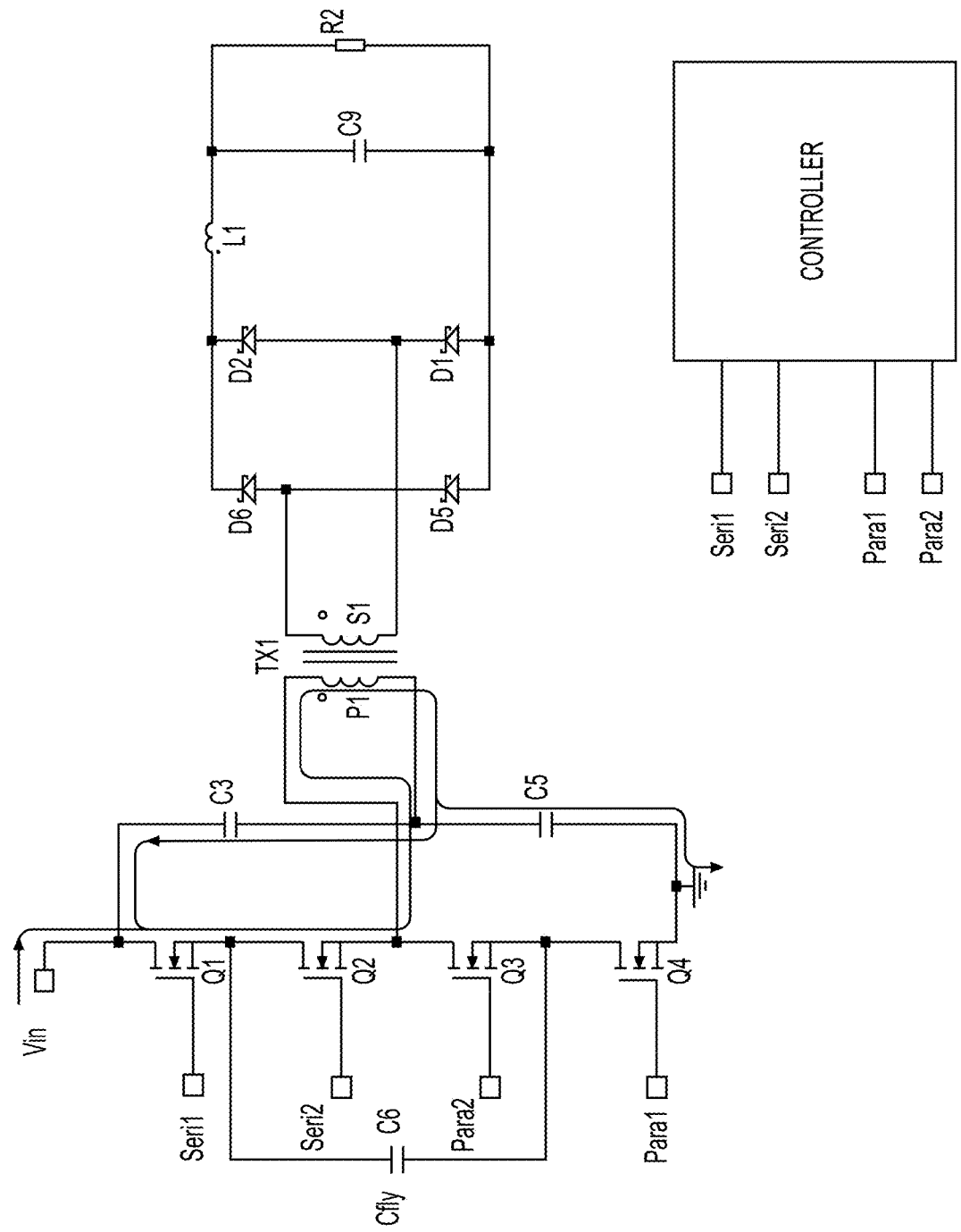
FIGS. 12 and 13 show current paths of two modes in half-bridge operation of the DC-DC converter circuit of FIG. 5.
Figure 13:
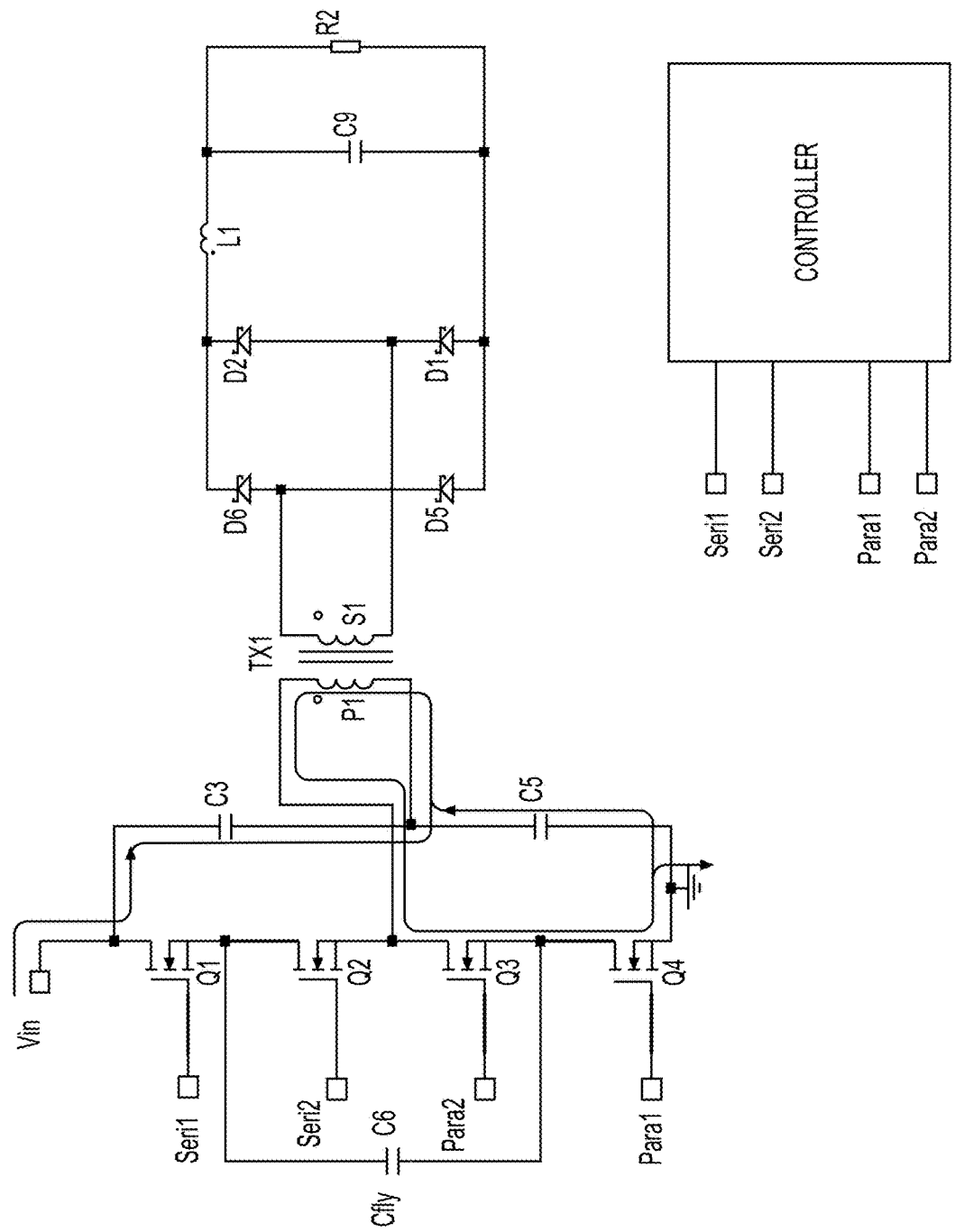

The controller controls the switching elements of the half-bridge circuit in the half-bridge operation as shown in the voltage timing diagram of FIG. 11. There are two modes, Modes 1 and 2, in the half-bridge operation in which the four switching elements Q1-Q4 are controlled so that ±Vin/2 is applied to the primary winding P1 of the transformer TX1. As shown in FIG. 11, switching elements Q1 and Q2 are simultaneously switched together, and switching elements Q3 and Q4 are simultaneously switched together. The current flow, shown as directional arrows, in the two Modes are shown in FIGS. 12 and 13.

In Mode 1, control signals Seri1 and Seri2 are low, and control signals Para1 and Para2 are high. Thus, switching elements Q1 and Q2 are OFF, and switching elements Q3 and Q4 are ON. Accordingly, current flows in the path of the arrow shown in FIG. 12 through capacitor C3, primary winding P1, and switching elements Q3 and Q4, and the voltage applied to the primary winding P1 of transformer TX1 is Vin/2.

The switching arrangement of Mode 1 of half-bridge operation is like that of Modes 2 and 4 in the three-level half-bridge operation discussed above. However, capacitor Cfly is not used at all in half-bridge operation. Therefore, Vin is divided by only capacitors C3 and C5, and voltage V1 is ½ Vin at the primary P1 of the transformer TX1.

In Mode 2, control signals Seri1 and Seri2 are high, and control signals Para1 and Para2 are low. Thus, switching elements Q1 and Q2 are ON, and switching elements Q3 and Q4 are OFF. Accordingly, current flows in the path of the arrow shown in FIG. 13 and the voltage applied to the primary winding P1 of transformer TX1 is −Vin/2.

Figure 14:
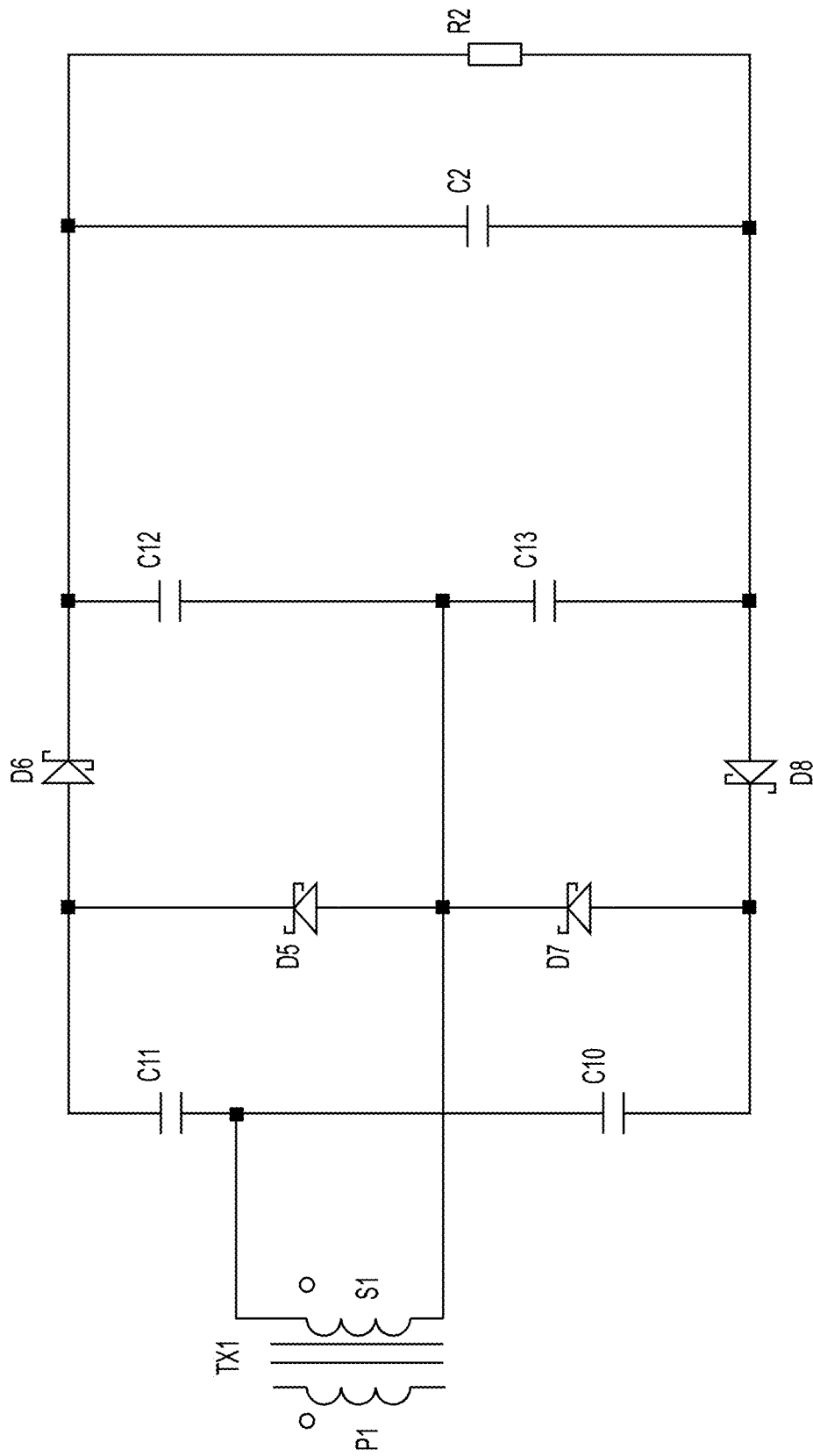
FIGS. 14-16 show alternate configurations of the secondary circuit of the DC-DC converter circuit of FIG. 5.
Figure 15:
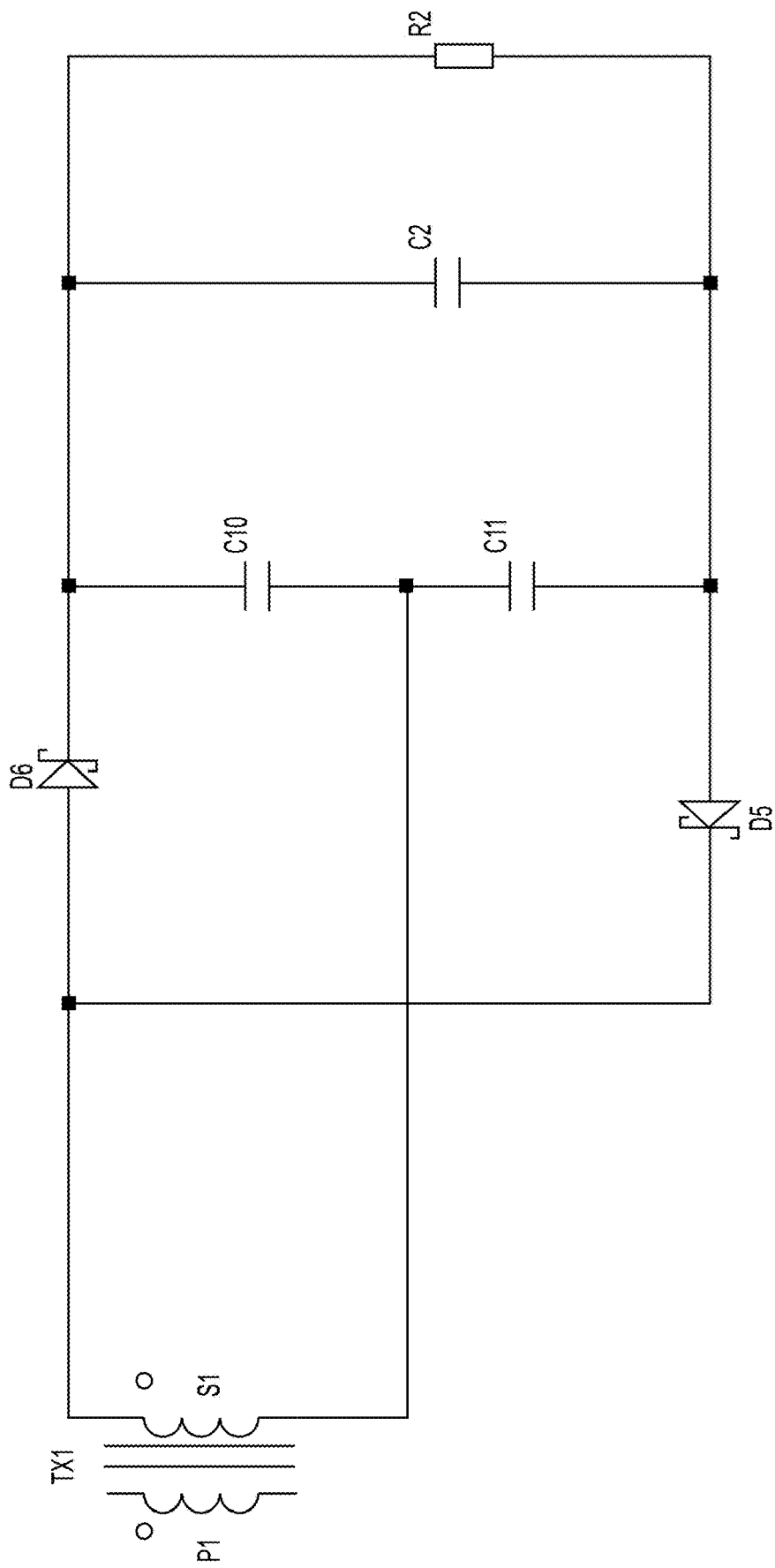
Figure 16:
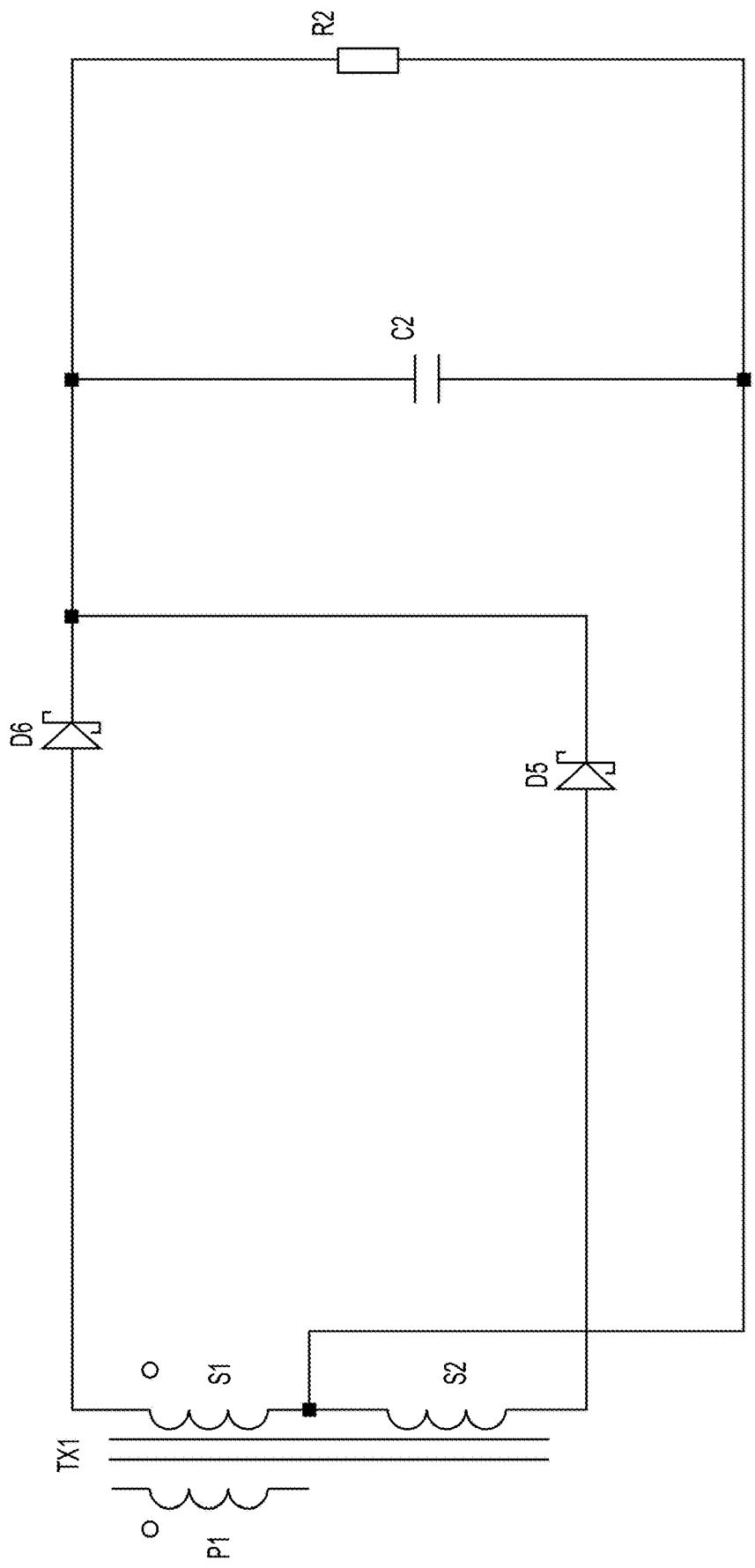

Alternative configurations of the secondary circuit can also be used. For example, if the DC-DC converter is unregulated, then, for example, the voltage quadrupler of FIG. 14, the voltage doubler of FIG. 15, and the center tap winding of FIG. 16 can be used as the secondary circuit.

In the 3-level half-bridge operation, a quarter of the input voltage (¼ Vin) reduces magnetizing current by half compared to half-bridge operation. Therefore, the voltage resolution on each turn of the transformer TX1 is smaller, and, if the DC-DC converter is unregulated, then the turns ratio and the output voltage of the transformer TX1 can be controlled more precisely. Additionally, magnetic core losses of the transformer can be reduced. Thus, the core of the transformer can be smaller than one used in half-bridge circuits outputting higher voltages.

A circuit with selectable 3-level half-bridge or half-bridge operation allows for design flexibility. Because the 3-level half-bridge operation and half-bridge operation are selectable, one circuit can cover situations with both wide input and output voltage ranges. For example, when the input voltage is too low and the target output voltage is high, the half-bridge mode can be selected. When a voltage boost is needed because of a low input voltage, more secondary turns are needed in a converter with 3-level half-bridge operation but no half-bridge operation. Without half-bridge operation, a converter with only 3-level half-bridge needs a bigger transformer than normal half-bridge operation. Additionally, one controller can be used in the circuit to control both the 3-level half-bridge mode and the half-bridge mode, thus component costs can be minimized.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A direct-current to direct-current (DC-DC) conversion circuit comprising: an input voltage; a single half-bridge circuit connected to the input voltage and including: a first leg with first, second, third, and fourth switching elements connected in series with each other; a second leg with first and second capacitors connected in series with each other and connected in parallel with the first leg; and a single flying capacitor connected to a node between the first switching element and the second switching element and connected to a node between the third switching element and the fourth switching element; a transformer including a primary winding connected to the single half-bridge circuit and including a secondary winding connected to a secondary circuit; and a controller that controls the first, the second, the third, and the fourth switching elements, wherein the controller selectively controls the single half-bridge circuit in: half-bridge operation in which ±Vin/2 is applied to the primary winding, where Vin is the input voltage; and 3-level half-bridge operation in which ±Vin/4 is applied to the primary winding.

2. The DC-DC conversion circuit of claim 1, wherein the controller uses pulse width modulated (PWM) control signals.

3. The DC-DC conversion circuit of claim 1, wherein the first, the second, the third, and the fourth switches are transistors.

4. The DC-DC conversion circuit of claim 1, wherein the primary winding is connected to a node between the second switching element and the third switching element and is connected to a node between the first capacitor and the second capacitor.

5. The DC-DC conversion circuit of claim 1, wherein the first switching element and the first capacitor are connected to the input voltage.

6. The DC-DC conversion circuit of claim 1, wherein the fourth switching element and the second capacitor are connected to a ground.

7. The DC-DC conversion circuit of claim 1, wherein the half-bridge operation includes:
  a first mode in which the first switching element and the second switching element are OFF and the third switching element and the fourth switching element are ON and in which −Vin/2 is applied to the primary winding; and
  a second mode in which the first switching element and the second switching element are ON and the third switching element and the fourth switching element are OFF and in which Vin/2 is applied to the primary winding.

8. The DC-DC conversion circuit of claim 1, wherein the 3-level half-bridge operation includes:
  a first mode in which the first switching element and the third switching element are OFF and the second switching element and the fourth switching element are ON and in which −Vin/4 is applied to the primary winding;
  a second mode in which the first switching element and the second switching element are OFF and the third switching element and the fourth switching element are ON and in which Vin/4 is applied to the primary winding;

a third mode in which the first switching element and the third switching element are OFF and the second switching element and the fourth switching element are ON and in which −Vin/4 is applied to the primary winding; and a fourth mode in which the first switching element and the second switching element are OFF and the third switching element and the fourth switching element are ON and in which Vin/4 is applied to the primary winding.

9. A direct-current to direct-current (DC-DC) conversion circuit comprising: an input voltage; a single half-bridge circuit connected to the input voltage and including: a first leg with first, second, third, and fourth switching elements connected in series with each other; a second leg with first and second capacitors connected in series with each other and connected in parallel with the first leg; and a single flying capacitor connected to a node between the first switching element and the second switching element and connected to a node between the third switching element and the fourth switching element; a secondary circuit including a rectifier circuit and not including an inductor; a transformer including a primary winding connected to the single half-bridge circuit and including a secondary winding connected to the rectifier circuit; and a controller that controls the first, the second, the third, and the fourth switching elements.

10. The DC-DC conversion circuit of claim 9, wherein the controller selectively controls the single half-bridge circuit in:

half-bridge operation in which ±Vin/2 is applied to the primary winding, where Vin is the input voltage; and 3-level half-bridge operation in which ±Vin/4 is applied to the primary winding.

11. The DC-DC conversion circuit of claim 9, wherein the controller uses pulse width modulated (PWM) control signals.

12. The DC-DC conversion circuit of claim 9, wherein the first, the second, the third, and the fourth switches are transistors.

13. The DC-DC conversion circuit of claim 9, wherein the primary winding is connected to a node between the second switching element and the third switching element and is connected to a node between the first capacitor and the second capacitor.

14. The DC-DC conversion circuit of claim 9, wherein the first switching element and the first capacitor are connected to the input voltage.

15. The DC-DC conversion circuit of claim 9, wherein the fourth switching element and the second capacitor are connected to a ground.

16. The DC-DC conversion circuit of claim 9, wherein the controller switches the first, the second, the third, and the fourth switching elements in half-bridge operation with a 50% duty cycle and in 3-level half-bridge operation with a 25% duty cycle.

17. The DC-DC conversion circuit of claim 9, wherein the half-bridge operation includes:

a first mode in which the first switching element and the second switching element are OFF and the third switching element and the fourth switching element are ON and in which −Vin/2 is applied to the primary winding; and a second mode in which the first switching element and the second switching element are ON and the third switching element and the fourth switching element are OFF and in which Vin/2 is applied to the primary winding.

18. The DC-DC conversion circuit of claim 9, wherein the 3-level half-bridge operation includes:

a first mode in which the first switching element and the third switching element are OFF and the second switching element and the fourth switching element are ON and in which −Vin/4 is applied to the primary winding;

a second mode in which the first switching element and the second switching element are OFF and the third switching element and the fourth switching element are ON and in which Vin/4 is applied to the primary winding;

a third mode in which the first switching element and the third switching element are OFF and the second switching element and the fourth switching element are ON and in which −Vin/4 is applied to the primary winding; and a fourth mode in which the first switching element and the second switching element are OFF and the third switching element and the fourth switching element are ON and in which Vin/4 is applied to the primary winding.

* * * * *